(12) United States Patent
Nygaard et al.

(10) Patent No.: US 12,540,280 B2
(45) Date of Patent: Feb. 3, 2026

(54) PROCESS FOR MONITORING THE OPERATION OF HYDRODEOXYGENATION OF A FEEDSTOCK

(71) Applicant: HALDOR TOPSØE A/S, Kgs. Lyngby (DK)

(72) Inventors: Gitte Thomsen Nygaard, Virum (DK); Sirisha Vadapalli, Herlev (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 17/636,971

(22) PCT Filed: Aug. 27, 2020

(86) PCT No.: PCT/EP2020/073986
§ 371 (c)(1),
(2) Date: Feb. 21, 2022

(87) PCT Pub. No.: WO2021/037987
PCT Pub. Date: Mar. 4, 2021

(65) Prior Publication Data
US 2022/0243132 A1    Aug. 4, 2022

(30) Foreign Application Priority Data
Aug. 29, 2019   (DK) .......................... PA 2019 01019

(51) Int. Cl.
*C10G 3/00*    (2006.01)
*C10G 45/02*   (2006.01)

(52) U.S. Cl.
CPC ................ *C10G 3/60* (2013.01); *C10G 3/50* (2013.01); *C10G 3/54* (2013.01);
(Continued)

(58) Field of Classification Search
CPC ... C10G 3/50; C10G 3/54; C10G 3/60; C10G 2300/1014; C10G 2300/1018;
(Continued)

(56) References Cited

U.S. PATENT DOCUMENTS

| | | | |
|---|---|---|---|
| 8,742,183 B2 * | 6/2014 | McCall | C10G 65/12 585/242 |
| 2008/0082308 A1 * | 4/2008 | Kant | G05B 23/0254 703/12 |

(Continued)

FOREIGN PATENT DOCUMENTS

| | | |
|---|---|---|
| CN | 105116096 A | 12/2015 |
| CN | 110021377 A | 7/2019 |
| EP | 1741767 A1 | 1/2007 |

OTHER PUBLICATIONS

Danish Search Report dated Mar. 3, 2020 issued by the Danish Patent and Trademark Office in Danish Patent Application No. PA 2019 01019. (8 pages).
(Continued)

*Primary Examiner* — In Suk C Bullock
*Assistant Examiner* — Jason Y Chong
(74) *Attorney, Agent, or Firm* — Boone IP Law

(57) ABSTRACT

In a process for monitoring the operation of hydrodeoxygenation of a feedstock, comprising the steps of directing the feedstock to contact a material catalytically active in hydrotreatment, monitoring the temperature in multiple locations of said catalytically active material, and providing an indication in a means for process monitoring when the difference between the temperature in a first location of said catalytically active material and the temperature in a second location of said catalytically active material is above a specified threshold value, the difference between the temperature in said first location of the catalytically active material and the temperature in said second location of the
(Continued)

catalytically active material is below the specified threshold value during an initial operation time.

16 Claims, 1 Drawing Sheet

(52) U.S. Cl.
CPC ............... *C10G 2300/1014* (2013.01); *C10G 2300/1018* (2013.01); *C10G 2300/1022* (2013.01); *C10G 2300/20* (2013.01); *C10G 2300/4006* (2013.01); *C10G 2300/4075* (2013.01)

(58) Field of Classification Search
CPC ........ C10G 2300/1022; C10G 2300/20; C10G 2300/202; C10G 2300/4006; C10G 2300/4075; C10G 45/04; Y02P 30/20
See application file for complete search history.

(56) References Cited

U.S. PATENT DOCUMENTS

| | | | |
|---|---|---|---|
| 2009/0162264 A1* | 6/2009 | McCall | C10G 65/12 422/187 |
| 2009/0326289 A1 | 12/2009 | Petri et al. | |
| 2012/0305446 A1 | 12/2012 | Daily | |
| 2013/0118951 A1 | 5/2013 | Komalarajun et al. | |
| 2013/0203179 A1* | 8/2013 | Vincent | C10G 69/123 436/147 |
| 2013/0255138 A1 | 10/2013 | Mayeur et al. | |
| 2014/0296057 A1 | 10/2014 | Ho et al. | |
| 2015/0052807 A1 | 2/2015 | Nousiainen et al. | |
| 2015/0268078 A1 | 9/2015 | Zhang et al. | |
| 2017/0022424 A1 | 1/2017 | Chapus et al. | |
| 2017/0253815 A1 | 9/2017 | Nouri et al. | |

OTHER PUBLICATIONS

International Search Report (PCT/ISA/210) and Written Opinion (PCT/ISA/237) mailed on Dec. 9, 2020, by the European Patent Office as the International Searching Authority for International Application No. PCT/EP2020/073986. (13 pages).
Pavlov K. F., Romanov P. G., Noskov A. A. Examples and exercises on the course of processes and apparatuses of chemical technology. Textbook for universities/edited by P. G. Romankov, tenth edition, L.: Chemistry, 1987, 576 pages, see p. 282).
Office Action issued on Mar. 27, 2025 by the Russian Patent Office in corresponding Russian Application No. 2022108124, 10 pages.
Office Action issued on Oct. 3, 2025 by the Canadian Intellectual Property Office in corresponding Canadian Application No. 3,148,013, 6 pages.

* cited by examiner

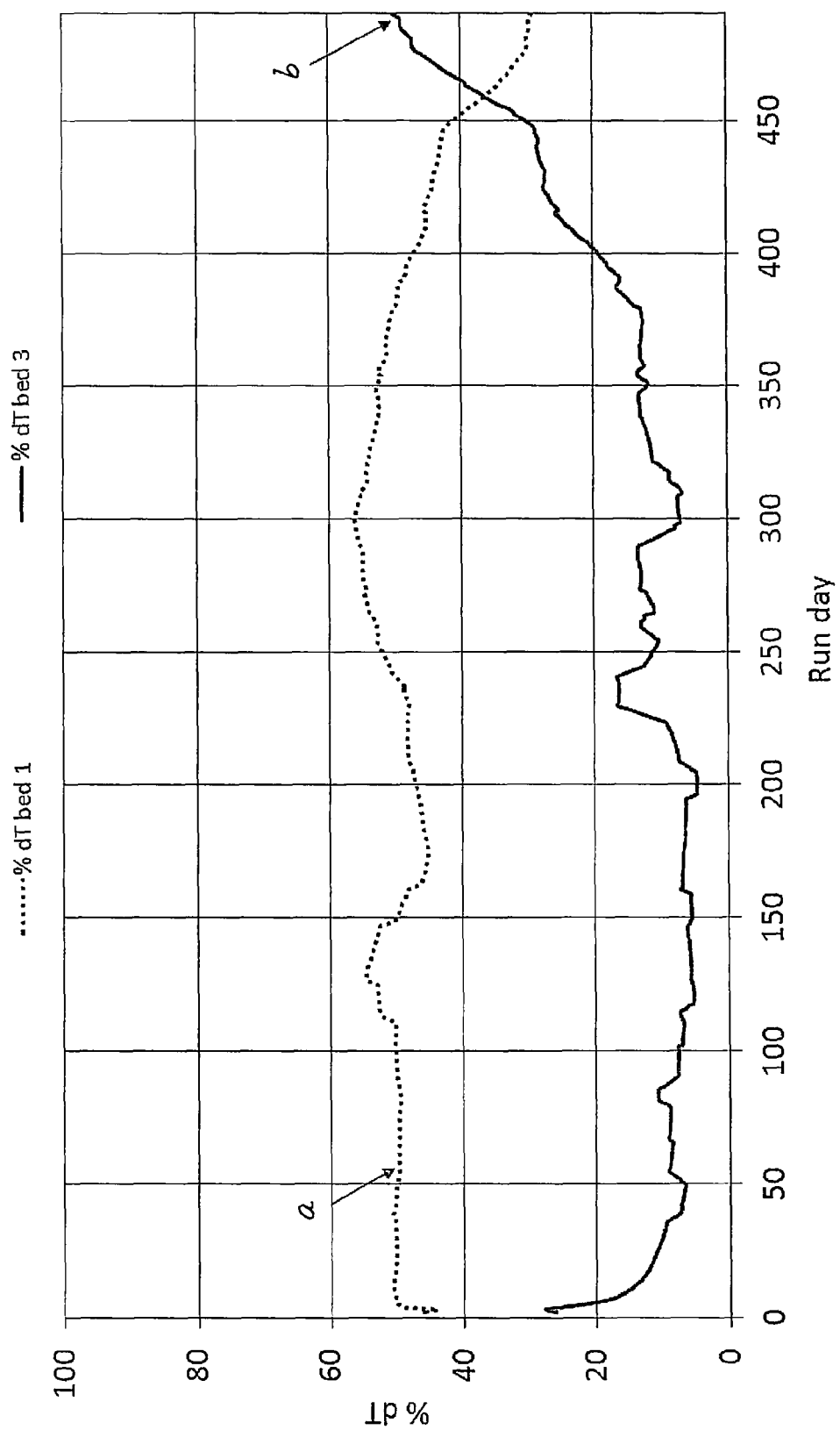

PROCESS FOR MONITORING THE OPERATION OF HYDRODEOXYGENATION OF A FEEDSTOCK

The present invention belongs within the field of hydroprocessing units, more specifically hydroprocessing units for the treatment of renewable feedstocks.

Environmental concerns about global warming and climatic changes are the main drivers in the search of alternative renewable energy sources to maintain the current increasing level of energy use. Although different forms of renewable energy (solar, wind etc.) will increasingly contribute to the energy supply, it is expected that liquid transportation fuels will remain pivotal in the transportation sector for decades to come. Currently, such transportation fuels are mainly derived from crude oil, and although electric and fuel-cell powered vehicles are getting a growing share of the passenger vehicle market, liquid transportation fuels derived from crude oil remain important for heavy duty road, rail and marine transport as well as in aviation where electrification is not feasible. Liquid hydrocarbon-based fuels can in principle be obtained from renewable energy sources such as electricity, e.g. by converting electricity to hydrogen by electrolysis of water and then using it to reduce $CO_2$. The problem of these solar fuels technologies is that they are still in their infancy, which explains the incentive to use natural gas (the cleanest burning fossil fuel) and renewable biomass as feedstocks in the transition to a low-carbon economy.

Hydrotreating, hydrocracking and hydroisomerization processes share many common features, so they are often discussed together as "hydroprocessing". Most hydroprocessing units employ specialized catalysts. As the name implies, they all consume hydrogen. Important chemical reactions include hydrodesulfurization (HDS), hydrodenitrogenation (HDN), hydrodeoxygenation (HDO), the saturation of olefins and aromatics, the conversion of large hydrocarbon molecules into smaller hydrocarbons (hydrocracking) and the isomerization of hydrocarbons (hydroisomerization).

Hydrocarbons may be produced from oxygenated hydrocarbons, such as triglycerides, fatty acids, resin acids, ketones, aldehydes or alcohols, where said oxygenates originate from one or more of a biological source, a gasification process, a pyrolysis process, Fischer-Tropsch synthesis, methanol based synthesis or a further synthesis process. In this process, the raw oxygenate feedstock is subjected to hydrodeoxygenation (HDO). Chemically, HDO removes oxygen from the feedstock molecules in the presence of gaseous hydrogen and an HDO catalyst and rejects it in the form of water, CO and $CO_2$.

In a process for hydrogenation of a feedstock comprising oxygenates, it is desirable to be able to determine the need for replacement of a material that is catalytically active in hydrotreatment. This is because catalyst deactivation in connection with hydrotreating of renewable fuels happens in another way than in fossil fuel hydrotreating, and in connection with split injection of the feedstock it may be desirable to have a protection bed arranged in the bottom of the hydrotreater to ensure that the dewaxing catalyst is not poisoned by impurities and/or oxygen.

As regards split injection of the feedstock, the feedstock can be injected in multiple beds, but preferably no feedstock is injected into the protection bed.

So the idea underlying the present invention is to arrange a protection bed in connection with the HDO reactor. For most plant designs, the bed will be arranged in the bottom of the HDO reactor. However, it can also be arranged in a separate reactor between the HDO reactor and the dewaxing reactor.

More specifically, the present invention relates to a process for monitoring the operation of hydrodeoxygenation of a feedstock, comprising the steps of
directing the feedstock to contact a material catalytically active in hydrotreatment,
monitoring the temperature in multiple locations of said catalytically active material, and
providing an indication in a means for process monitoring when the difference between the temperature in a first location of said catalytically active material and the temperature in a second location of said catalytically active material is above a specified threshold value, optionally for a specified time of operation,
wherein the difference between the temperature in said first location of said catalytically active material and the temperature in said second location of said catalytically active material is below said specified threshold value during an initial time of operation.

The means for process monitoring is preferably a control room screen, but the indication in the process monitoring may also be triggering a local or remote warning to review the performance of the catalytically active material.

The specified threshold may either be defined as an absolute difference in temperature, or be defined as a relative value, compared to the difference in temperature from the inlet of said catalytically active material to the outlet of said catalytically active material, also known as the exotherm of the process.

The absolute threshold value may be 10° C., 20° C. or 40° C. The effect of the threshold being 10° C., 20° C. or 40° C. is related to a balance between sensitivity and risk of false alarm.

When a moderate temperature increase of 10° C. is seen over a catalytically active material assumed to be in excess, and thus not expected to show temperature increase, this will typically be an early indication of the upstream material having insufficient activity. When a higher temperature increase of 20° C. or 40° C. the warning is closer in time to the required time of action.

The relative threshold may be a more robust measure, especially in the case of varying feedstocks, showing different exotherms. The exotherm in the processes in question may be from 40° C. or 80° C. to 150° C. or 200° C., such that the exotherm is sufficient for being an indicator of the activity of the catalytically active material while not being too excessive for operation. The relative threshold will typically be 10%, 20% or 40% of the actual or time weighted exotherm. In this respect the exotherm is typically regarded as the difference in temperature from reactor inlet to reactor outlet, and the temperature difference is typically measured across a reactor catalyst bed.

Preferably the feedstock comprises one or more oxygenates selected from the group consisting of triglycerides, fatty acids, resin acids, ketones, aldehydes and alcohols, said oxygenates originating from one or more of a biological source, a gasification process, a pyrolysis process, a Fischer-Tropsch synthesis, a methanol-based synthesis or a further synthesis process. Such a process is a process being viable for receiving a wide range of feedstocks, especially of renewable origin.

The feedstock preferably originates from vegetables, plastics, plants, algae, animals, fish, vegetable oil refining, domestic waste, sewage sludge or industrial organic waste, such as tall oil or black liquor.

While the invention primarily is targeted at hydroprocessing of feedstocks consisting of 100% renewables, the same challenges are present for co-processing mixtures of fossil and renewable feedstocks.

Generally, it is possible to hydroprocess feedstock mixtures containing up to about 10% renewables without having to revamp the hydroprocessing unit, but co-processing operation with 20% or 50% renewables may also be attractive.

The material that is catalytically active in hydrotreatment preferably consists of one or more catalyst layers designed specifically for fixed-bed hydrodeoxygenation purposes.

This way, the dewaxing reactor and the dewaxing catalyst will both be protected, which leads to a longer lifetime of the dewaxing catalyst. The protection bed also protects the dewaxing catalyst against organic sulfur and nitrogen. Furthermore, the protection bed enables hydroprocessing of feedstocks with a high content of nitrogen and sulfur. The protection bed, in addition, can be seen as a warning measure to the operator, because when the exotherm in this bed (the difference in temperature from bed inlet to outlet) starts to rise, it means that the beds on top of the protection bed have lost their activity.

Thus, in a process for hydrogenation of a feedstock comprising oxygenates, the invention relates to a method for determining the need for replacement of a material that is catalytically active in hydrotreatment. The process comprises the steps of directing the feedstock to contact a material catalytically active in hydrotreatment and monitoring the temperature in multiple locations of said material, wherein replacement of the material is determined as needed when the increase in temperature over an amount of the material exceeds a pre-defined limit.

Regarding prior art, U.S. Pat. No. 9,938,469 B2 relates generally to processes and systems for the hydrodeoxygenation of an oxygenate feedstock that increases the conversion of oxygenates to hydrocarbons while avoiding any detrimental effects resulting from increasing the severity of the oxygenation reaction. The systems comprise a catalyst-containing reactor, a first and a second separator, a distillation apparatus configured to separate solvents from unreacted oxygenates and a conduit to return the unreacted oxygenates to the reactor.

In U.S. Pat. No. 9,523,041 B2, a method is described which involves reducing a pressure drop across a hydroprocessing reactor having a reactor feed and producing a hydroprocessing product, where the reactor feed includes a bio-oil feed and a hydrocarbon diluent. The step of reducing the pressure drop comprises stopping or substantially reducing the bio-oil feed supplied to the reactor and supplying the hydrocarbon diluent to the reactor.

Catalysts, methods and reactor systems for converting oxygenated hydrocarbons to various oxygenated compounds are described in US 2015/0183701. The oxygenated compounds are e.g. cyclic ethers, monooxygenates, dioxygenates, ketones, aldehydes, carboxylic acids and alcohols produced from oxygenated hydrocarbons, such as carbohydrates, sugars, sugar alcohols, sugar degradation products and the like, using catalysts containing Group VIII metals. The oxygenated compounds produced are useful in the production of chemicals, liquid fuels and other products. None of these prior art documents mention the possibility of—or the need for—arranging a protection bed in the bottom of a hydrodeoxygenation reactor.

Within the field of the invention, the standard solution has so far been (1) not to use a protection bed in the HDO reactor and (2) to use fewer catalyst beds altogether with no warning before breakthrough to the dewaxing catalyst, which is very selective towards isomerization. This has meant that the end of run state of the catalyst in the HDO reactor was realized with very short notice, thus hindering any planned scheduling of catalyst exchange. The impact of this is that the reactor will have to run with a deactivated catalyst, which will lead to a decrease in capacity and/or a yield loss.

The Applicant has recently launched a series of dewaxing catalysts that are true isomerization catalysts: TK-910 D-wax, TK-920 D-wax, TK-930 D-wax and TK-940 D-wax. Other relevant catalysts are Applicant's TK-928 and TK-939, specifically designed for improvement of cold flow properties.

By using an extra bed of catalysts as protection bed in the bottom of the HDO reactor or in a separate reactor between the HDO reactor and the dewaxing reactor, the following effects and advantages are obtained:

a longer lifetime of the dewaxing catalyst,
a better operability, and
a warning before breakthrough to the dewaxing catalyst.

In addition, feedstocks with high contents of nitrogen and sulfur can be handled.

Further, there is a safety issue in connection with letting oxygen compounds slip to the dewaxing catalyst. The oxygen compounds will result in a very high exotherm, which is unacceptable for the dewaxing catalyst due to the risk of temperature excursions, since the dewaxing catalyst is a zeolite-containing catalyst. Thus, the dT over the dewaxing temperature should be kept low in order to minimize this risk.

The problem with the very high exotherm can be counteracted by recycling part of the outlet from the HDO reactor to the inlet thereof and/or adding a "diluent" gas not containing oxygen to the inlet of the HDO reactor.

EXPERIMENTAL

Experiments have shown in more detail how—during a cycle with renewables—the exotherm over time moves down through the catalytic bed. These experiments used a bed consisting of five consecutive catalyst layers as follows:

| | |
|---|---|
| layer 1: | 3/16" Ring |
| layer 2: | 1/8" Ring |
| layer 3: | TK-339 1/10" QL |
| layer 4: | TK-341 1/10" QL |
| layer 5: | TK-569 1/16" TL | where the TK-339 and TK-341 catalysts are designed for fixed-bed hydrodeoxygenation (HDO) purposes, while the TK569 catalyst provides high hydrodenitrogenation (HDN) and hydrodesulfurization (HDS) activity.

This catalytic bed received a fresh feed stream. By specifically watching the behavior of the exotherm (% dT) as a function of the number of run days for bed no. 1, it was seen that, in the beginning, most of the reactions take place in layers 1, 2 and 3. But already after 50 run days, the dT above these layers begin to decrease and move to layer 4 as TK-339 starts to deactivate. Around run day 120, the dT above layer 4 begins to decrease, while it begins to increase in layer 5.

At the start of run (SOR), approximately 50% of the dT is happening in the HDO and HDN layer, and the hydrogenation activity of the P guard starts to deactivate after around 100 run days. The HDO catalyst starts to deactivate after 130 run days, and more than 50% of the dT has moved to layer 5 (HDO/HDN) after 220 run days.

At the end of run (EOR) after 500 run days, almost all of the reactions take place in the last layer, i.e. layer 5. Furthermore, it is seen that approximately 45% of the dT is happening in the TK-341 or TK-569 layers at the start of run (SOR). After 50 run days, TK-339 starts to deactivate, and TK-341 starts to deactivate after 120 run days, having no more activity left after one year of catalyst life.

The TK-339 has no more activity left after 175 run days, and more than 50% of the dT has moved to the TK-569 layer after 200 run days.

In another experiment with four beds, it was observed that around day 360, dT begins to decrease in beds 1 and 2, i.e. the two beds receiving a fresh renewable feed stream, while the dT increases in bed 3 (which bed, in this experiment, serves as the protection bed).

In the FIGURE, a simplified run is shown, only including dT of bed 1 and bed 3. At (a), fresh renewable feed is injected into beds 1 and 2, which do all the renewable reactions. At EOR, shown as (b), 50% of the exotherm is now happening in bed 3, i.e. the protection bed, meaning that this bed is now doing a significant part of the HDO reactions.

The invention claimed is:

1. A process for monitoring hydrodeoxygenation of a feedstock, comprising the steps of:
   directing the feedstock to a fixed-bed hydrodeoxygenation (HDO) reactor to contact a material catalytically active in exothermic hydrotreatment to hydrodeoxygenate said feedstock, wherein the catalytically active material comprises an upstream portion and a downstream portion, wherein said upstream portion is located between an inlet of said catalytically active material and said downstream portion, and wherein said downstream portion is located between said upstream portion and an outlet of said catalytically active material,
   monitoring a first temperature in a first location in said downstream portion of said catalytically active material and a second temperature in a second location in said downstream portion of said catalytically active material, and
   providing an indication in a means for process monitoring when a difference between the first temperature and the second temperature is above a specified threshold value, optionally for a specified time of operation,
   wherein the difference between the first temperature and the second temperature is below said specified threshold value during an initial time of operation, and
   wherein, upon said indication being provided, a replacement of said catalytically active material is scheduled.

2. The process according to claim 1, wherein the means for process monitoring is a control room screen or submission of a message via local or remote means of communication.

3. The process according to claim 1 where the specified threshold value is either defined as an absolute difference in temperature or defined as a relative value, compared to a difference in temperature from the inlet of said catalytically active material to the outlet of said catalytically active material.

4. The process according to claim 3, wherein the specified threshold value is an absolute difference in temperature of 10° C.

5. The process according to claim 3, wherein the specified threshold is a relative threshold of 10% of the difference in temperature from the inlet of said catalytically active material to the outlet of said catalytically active material.

6. The process according to claim 1, wherein the difference in temperature from the inlet of said catalytically active material to the outlet of said catalytically active material is from 40° C. to 200° C.

7. The process according to claim 1, wherein the feedstock comprises one or more oxygenates selected from the group consisting of triglycerides, fatty acids, resin acids, ketones, aldehydes and alcohols, said oxygenates originating from one or more of a biological source, a gasification process, a pyrolysis process, Fischer-Tropsch synthesis, or methanol-based synthesis.

8. The process according to claim 7, wherein the feedstock originates from plants, algae, animals, fish, vegetable oil refining, domestic waste or industrial organic waste.

9. The process according to claim 1, wherein the material which is catalytically active in hydrotreatment consists of one or more catalyst layers designed for fixed-bed hydrodeoxygenation purposes.

10. The process according to claim 9, wherein the material catalytically active in hydrotreatment consists of one or more hydrotreating catalyst beds in the upstream portion and a protection bed in the downstream portion, and
    wherein the first location is a bed inlet of the protection bed and the second location is a bed outlet of the protection bed.

11. The process according to claim 9, wherein said one or more catalyst layers comprises a protection bed arranged in a downstream bottom of the catalytically active material, and no feedstock is injected into the protection bed during the process.

12. The process according to claim 1, wherein a part of a stream from an outlet from the HDO reactor is recycled to an inlet of the HDO reactor and/or a diluent, that does not contain oxygen, is added to the inlet of the HDO reactor.

13. The process according to claim 1, wherein the feedstock comprises a mixture of a renewable feedstock and a fossil feedstock.

14. The process according to claim 1, wherein the feedstock contains up to about 50% renewables.

15. A process for monitoring hydrodeoxygenation of a feedstock, comprising the steps of:
    directing the feedstock to a fixed-bed hydrodeoxygenation reactor comprising a bed, the bed comprising a material catalytically active in exothermic hydrotreatment to contact the material catalytically active in hydrotreatment to hydrodeoxygenate said feedstock, wherein the catalytically active material comprises an upstream portion and a downstream portion, wherein said upstream portion is located between an inlet of said catalytically active material and said downstream portion, and wherein said downstream portion is located between said upstream portion and an outlet of said catalytically active material,
    monitoring a first temperature in a first location in said downstream portion of said catalytically active material and a second temperature in a second location in said downstream portion of said catalytically active material, and
    providing an indication in a means for process monitoring when a difference between the first temperature and the second temperature is above a specified threshold value, optionally for a specified time of operation,
    wherein the difference between the first temperature and the second temperature is below said specified threshold value during an initial time of operation, and wherein, upon said indication being provided, a replacement of said catalytically active material is scheduled, wherein the material catalytically active in hydrotreatment consists of one or more hydrotreating catalyst beds in the upstream portion and a protection bed in the downstream portion, wherein the first location is a bed inlet of the protection bed and the second location is a bed outlet of the protection bed.

16. A process comprising monitoring a system, the system comprising:
- a hydrodeoxygenation reactor, wherein the hydrodeoxygenation reactor comprises one or more hydrotreating catalyst beds and a protection bed, wherein said protection bed is arranged downstream of said one or more hydrotreating catalyst beds, wherein the one or more hydrotreating catalyst beds and the protection bed comprise a material catalytically active in exothermic hydrotreatment; and
- a dewaxing reactor comprising a dewaxing catalyst, wherein the dewaxing reactor is arranged downstream of said hydrodeoxygenation reactor, the method comprising:
- directing a feedstock to the hydrodeoxygenation reactor to contact the material catalytically active in hydrotreatment in said one or more hydrotreating catalyst beds and said protection bed to hydrodeoxygenate said feedstock;
- monitoring a first temperature in a first location of the protection bed and a second temperature in a second location of the protection bed; and
- providing an indication in a means for process monitoring when the difference between the first temperature and the second temperature is above a specified threshold value, optionally for a specified time of operation, wherein the difference between the first temperature and the second temperature is below said specified threshold value during an initial time of operation, and wherein, upon said indication being provided, a replacement of said catalytically active material is scheduled, wherein the protection bed is configured to reduce the risk of the dewaxing catalyst being poisoned by impurities and/or oxygen, wherein no feedstock is injected into the protection bed during the process.

* * * * *